United States Patent [19]

Esserman et al.

[11] Patent Number: 5,111,504
[45] Date of Patent: May 5, 1992

[54] INFORMATION PROCESSING APPARATUS WITH REPLACEABLE SECURITY ELEMENT

[75] Inventors: James N. Esserman, San Diego; Paul Moroney, Cardiff, both of Calif.

[73] Assignee: General Instrument Corporation, Hatboro, Pa.

[21] Appl. No.: 568,990

[22] Filed: Aug. 17, 1990

[51] Int. Cl.⁵ .............................................. H04L 9/02
[52] U.S. Cl. ...................................... 380/21; 380/16; 380/23; 380/25; 380/47
[58] Field of Search ............... 380/16, 20, 21, 23, 380/25, 45, 47

[56] References Cited

U.S. PATENT DOCUMENTS

| | | | |
|---|---|---|---|
| 4,613,901 | 9/1986 | Gilhousen et al. | 358/122 |
| 4,634,808 | 1/1987 | Moerder | 178/22.14 |
| 4,663,664 | 5/1987 | Ragan et al. | 380/16 |
| 4,712,238 | 12/1987 | Gilhousen et al. | 380/20 |
| 4,792,973 | 12/1988 | Gilhousen et al. | 380/24 |
| 4,799,635 | 1/1989 | Nakagawa | 364/900 |
| 4,802,214 | 1/1989 | Barany | 380/20 X |
| 4,864,615 | 9/1989 | Bennett et al. | 380/21 |
| 4,890,321 | 12/1989 | Seth-Smith et al. | 380/20 |

OTHER PUBLICATIONS

"Proposal for New Part 6 of the EBU Specification for the MAC/Pocket Family", Oct. 24, 1988.

Primary Examiner—Tod R. Swann
Attorney, Agent, or Firm—Barry R. Lipsitz

[57] ABSTRACT

A field upgradeable security system deciphers signals received from a communication network. An information processor includes a receptacle for receiving a replaceable security element. The replaceable security element generates a working key necessary to the operation of the information processor. The working key is communicated to the information processor encrypted under a secret key. The information processor decrypts the encrypted working key for use in deciphering a received communication signal. Additional layers of encryption can be added to the communications between the information processor and security element to increase the level of security.

68 Claims, 3 Drawing Sheets

INFORMATION PROCESSING APPARATUS WITH REPLACEABLE SECURITY ELEMENT

BACKGROUND OF THE INVENTION

The present invention relates generally to security apparatus for information processing systems, and more particularly to apparatus for selectively controlling the deciphering of information signals, such as scrambled television programs.

There are many schemes available for controlling the remote descrambling of television signals. Such schemes are necessary to maintain security in subscription television systems, including cable television systems and satellite television systems. Typically, a system subscriber is provided with a descrambler connected between a television signal source (e.g., cable feed or satellite receiver) and a television set. Each subscriber's descrambler is remotely accessed by the system operator to enable or disable the receipt of specific services such as the Home Box Office movie channel or special pay-per-view sports events. One problem with such systems is that "pirates" are apt to break the system security and sell "black boxes" that enable the reception of all programming without paying for the services received. It has been difficult and expensive for system operators to contend with the piracy problem. Once a particular security system is breached, the system operator must usually replace all existing descramblers with new units that operate with a different security algorithm. This solution is not cost effective.

Various systems have been designed to make piracy more difficult. One such system is disclosed in U.S. Pat. No. 4,613,901 to Gilhousen, et al entitled "Signal Encryption and Distribution System for Controlling Scrambling and Selective Remote Descrambling of Television Signals", incorporated herein by reference. In the Gilhousen, et al system, a "working key" signal is generated in accordance with the well known data encryption standard ("DES") security algorithm, after the algorithm is keyed by either a common category key signal or some other key signal. A unique encryption key stream is generated by processing an initialization vector signal in accordance with the DES algorithm when the algorithm is keyed by the working key signal. A television signal is scrambled in accordance with the unique encryption key stream to provide a scrambled television signal. A plurality of unique encrypted category key signals individually addressed to different selected subscribers' descramblers are generated by processing the initial common category key signal in accordance with the DES algorithm when the algorithm is keyed by a plurality of different "unit key" signals associated with different descramblers. The scrambled television signal, initialization vector signal, and plurality of encrypted category key signals are broadcast to the descramblers. At each descrambler, the encryption key stream is reproduced to descramble the television signal. Each descrambler has its unique unit key signal stored in memory for use in reproducing the common category key signal when the descrambler is addressed by its unique encrypted category key signal. By using the DES algorithm, the Gilhousen, et al system provides a high level of security, making it difficult and expensive for a pirate to reproduce the working key.

Other selective subscription descrambling systems are disclosed in Gilhousen, et al U.S. Pat. Nos. 4,712,238 and 4,792,973. These patents provide improved systems for enabling descrambling of a received scrambled signal on an impulse-purchase basis. U.S. Pat. No. 4,634,808 to Moerder discloses a system for reproducing a key signal in a descrambler that is unique to the descrambler, and was used in encrypting a key signal that must be decrypted for use in descrambling a television signal. However, no security system is unbreakable, and determined pirates can be expected to ultimately prevail.

It would be advantageous to provide an improved system in which security can be economically upgraded after a breach. It would be further advantageous if the security upgrades could be made in the field by the simple replacement of a relatively low cost security element containing a new security algorithm. The security element should be replaceable by a subscriber in his home without any need for a visit from service personnel.

It would also be advantageous to protect the interface between the subscriber's descrambler and the replaceable security element, so that others could not easily manufacture their own security elements to defeat the system or to use the descrambler for other unauthorized purposes. If the wrong security element is installed, the descrambler must not work.

The present invention provides an upgradeable security system, an information processor, and a replaceable security element that enjoy the aforementioned advantages.

SUMMARY OF THE INVENTION

In accordance with the present invention, a field upgradeable security system is provided for deciphering signals received from a communication network. An information processor includes a receptacle for receiving a replaceable security element. The replaceable security element includes means for generating a working key, means for encrypting the working key with a secret key, and means for communicating the encrypted working key to the information processor. The information processor decrypts the encrypted working key for use in deciphering a received communication signal.

In a preferred embodiment, the secret key comprises a first authentication key associated with the information processor. The first authentication key is securely communicated to the security element for use in encrypting the working key. A second authentication key is associated with the security element. Means are provided for securely communicating the second authentication key to the information processor. The security element then encrypts the working key with both the first and second authentication keys.

The information processor can further comprise a first unit key associated therewith and means for receiving the second authentication key encrypted under the first unit key. Means are provided for decrypting the received second authentication key for subsequent use in decrypting the working key. Similarly, the security element can comprise a second unit key associated therewith and means for receiving the first authentication key encrypted under the second unit key. The received first authentication key is decrypted by the security element for subsequent use in encrypting the working key prior to communicating it to the information processor.

In order to generate the working key, the security element requires input data that can be securely communicated to it via the information processor. The information processor receives the data in an encrypted form from a "trusted center", decrypts it at least in part, and then further encrypts it for communication to the security element. In a preferred embodiment, the data is received by the information processor encrypted under at least the second unit key, and communicated from the information processor to the security element under the second unit key and at least one of the authentication keys.

In another embodiment, a replaceable security element is provided for use in combination with an information processor having a secret cryptographic key. The security element receives data for use in generating a working key. The security element receives the secret key via an encrypted communication, and decrypts the secret key for use in encrypting the working key. The encrypted working key is then communicated to the information processor by the security element for use in processing an information signal. In a preferred implementation, the secret key is received by the security element encrypted under a unit key associated therewith. An additional cryptographic key may be associated with the security element, and the working key may be encrypted with both the secret and additional keys. The data received by the security element for use in generating the working key may also be encrypted under at least one of the secret and unit keys. In this event, the security element comprises means for decrypting the received data.

An information processor is provided for use in combination with a replaceable security element. Means are provided within the information processor for receiving the security element. A secret cryptographic key is associated with and stored in the information processor. Means are provided for receiving a working key, encrypted under the secret key, from the security element. The received working key is decrypted and used to process an information signal. In a preferred embodiment, an additional cryptographic key associated with the security element is received and stored. The received working key is encrypted under the secret key and the additional key for decryption and use by the information processor.

The information processor can also include means for receiving data for use by the security element in generating the working key. Means are provided for communicating the data to the security element. Means may also be provided for encrypting the data under one or both of the secret and additional keys before it is communicated to the security element.

The information processor can further comprise means for receiving and storing characteristic information (e.g., an address) identifying the security element and means for screening the received data, on the basis of the characteristic information, for selective communication to the security element. The information signal processed by the information processor can comprise a scrambled communication signal to be descrambled. Means can be provided for enabling and disabling the security element in response to a received control signal, and for descrambling communication signals according to a default descrambling algorithm in the absence of an enabled security element.

DETAILED DESCRIPTION OF THE INVENTION

The present invention provides a system for recovering from security compromises in an information processing system, such as a satellite television communication network. In an illustrated embodiment, a replaceable security element is coupled to a satellite television descrambler for use in generating working keys that are subsequently communicated to the descrambler to enable the descrambling of received signals. The security element is a relatively low cost device that is replaced with a new security element operating with a different security algorithm each time a prior security element or its algorithm has been breached. The security element can comprise, for example, a credit card sized "smart card" or a cartridge containing a microprocessor based working key generator together with various supporting components.

Figure 1:
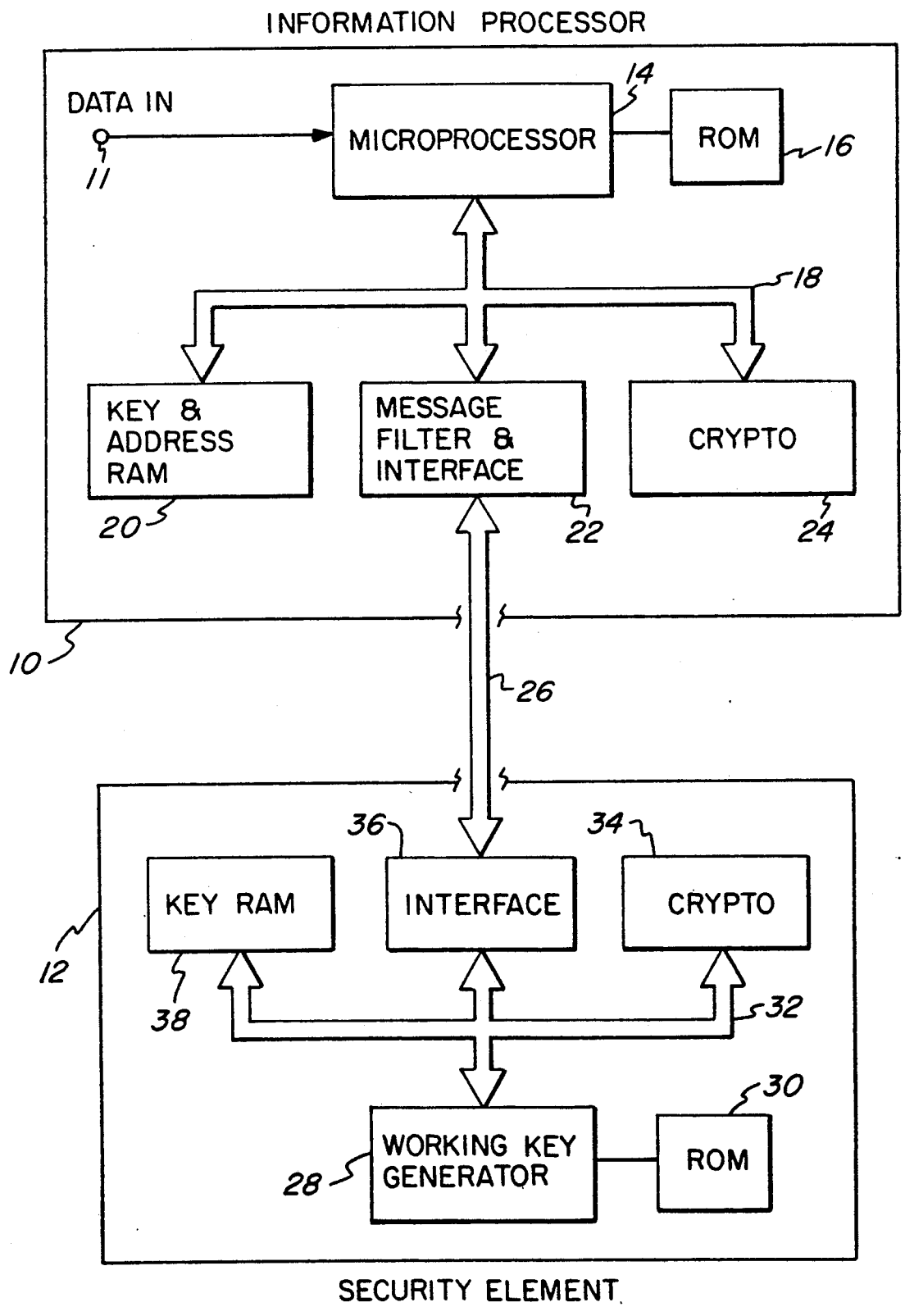
FIG. 1 is a block diagram illustrating an information processor and replaceable security element in accordance with the present invention.

Turning to FIG. 1, an information processor ("module") generally designated 10 is provided. Information processor 10 can comprise a descrambler module such as the VideoCipher II Plus descrambler module manufactured by General Instrument Corporation for use in connection with the VideoCipher line of satellite receivers. Information processor 10 includes all of the components of the VideoCipher II Plus descrambler module, including a microprocessor 14 and ROM 16 for storing program instructions for the microprocessor. A cryptographic processor ("crypto") 24 is also provided in the VideoCipher II Plus descrambler module, coupled to microprocessor 14 via bus 18, for effecting signal descrambling on the basis of a working key signal as set forth in the aforementioned Gilhousen, et al U.S. Pat. No. 4,613,901.

In accordance with the present invention, information processor 10 also includes several new components. These are a key and address random access memory ("RAM") 20 and a message filter and interface circuit 22. Key and address RAM 20 stores a secret key for the information processor and a unique address assigned to a security element generally designated 12. Message filter and interface 22 uses the security element address stored in RAM 20 to determine what messages received from the communication network (e.g., satellite television system) at input terminal 11 are specifically addressed to security element 12. The message filter discards all messages not intended for its associated security element 12.

It should be appreciated that other methods exist for providing messages to specific security elements. For example, data sent to a security element by a trusted center can be communicated to the associated information processor with instructions for passing the data on to the security element. The data itself can be encrypted under the information processor unit key to prevent its use by any other information processor and security element combination.

Information processor 10 and security element 12 are connected via signal path 26 and their respective interfaces 22, 36. Signals flowing from information processor 10 to security element 12 include the data required by the security element to generate working keys and data identifying a secret "authentication" key uniquely associated with the information processor. In a preferred embodiment, security element 12 also has its own authentication key, which can be preloaded upon manufacture or subsequently received by the security element via path 26 from data input to the information processor at terminal 11. The working keys required by crypto 24 to descramble an information (e.g., television) signal are also communicated over path 26, from security element 12 to information processor 10.

In accordance with the present invention, the working keys are encrypted by security element 12 with the secret authentication key of information processor 10. The encryption of the working keys with the information processor's secret key provides a substantial advantage in the present system. In particular, a security element that does not know the information processor's secret authentication key will be unable to properly encrypt working keys for use by crypto 24. Even if a security element were provided that could generate the necessary working keys, there would be no way to intelligibly transfer the working keys to the information processor without knowledge of the secret key. Any information that an improper security element transferred to information processor 10 without encryption under the secret key would be processed by crypto 24, but would not result in a properly descrambled signal. Therefore, there is no need to disable information processor 10 if an unauthorized security element is connected to it. If the wrong security element is installed, the system simply will not work.

Security element 12 includes a cryptographic processor 34 that operates in combination with a microprocessor "working key generator" 28 to provide the working keys. Those skilled in the art will appreciate that the functions of working key generator 28 and cryptographic processor 34 can be provided in a single microprocessor. Data for generating the working keys, which can comprise, for example, a category key and program key transmitted by a trusted center as disclosed in the aforementioned U.S. Pat. No. 4,613,901, is preferably received via path 26 in an encrypted form. Crypto 34 decrypts the encrypted data and passes it to working key generator 28 via bus 32. Program instructions containing the security algorithm used by working key generator 28 are stored in ROM 30. It is noted that the security algorithm could alternately be contained in special purpose hardware that is part of the working key generator. An example of a known security algorithm is the DES algorithm previously mentioned. New security algorithms will be developed for each version of security element that is used to replace a prior version breached by a pirate. In this manner, each time a pirate breaks a system, all that the system operator has to do is to send out new security elements to all authorized subscribers. The subscribers replace the old security element with the new one, and once the existing subscriber base has been upgraded all signals for the breached system are terminated. A pirate will then have to break the new system, at which time it will be replaced by a subsequent system.

During the transition from an old security system to a new security system, authorization signals can be transmitted for both systems. Alternately, crypto 24 in information processor 10 can resort to a default descrambling algorithm until all subscriber units have been upgraded. The default algorithm can be one previously used in existing VideoCipher II Plus descrambler modules.

Nonvolatile memory (e.g., key RAM 38) is provided in security element 12 to store the secret authentication key of information processor 10 for use by crypto 34, e.g., in encrypting the working keys prior to transmission via interface 36 and path 26 to information processor 10. Key RAM 38 will also store any other keys necessary in the specific implementation used by security element 12, such as a unique unit key and/or authentication key associated with the security element. Power for security element 12 can be provided by a battery contained therein or from a power supply in information processor 10 via path 26.

When it becomes necessary to implement a security upgrade, each subscriber is provided with a new security element. Upon installation of the new security element, an initialization routine takes place. This can be effected, for example, by instructing the subscriber to call a toll free telephone number to enable the receipt of an initialization message from a trusted center via the satellite receiver. This is referred to as "remote initialization". Alternately, the security element and/or information processor can be programmed to automatically request (e.g., via a telephone modem) remote initialization upon installation of a new security element. In a different embodiment, the security element is pre-initialized with the necessary initialization data by the system operator prior to sending it to the subscriber.

Figure 2:
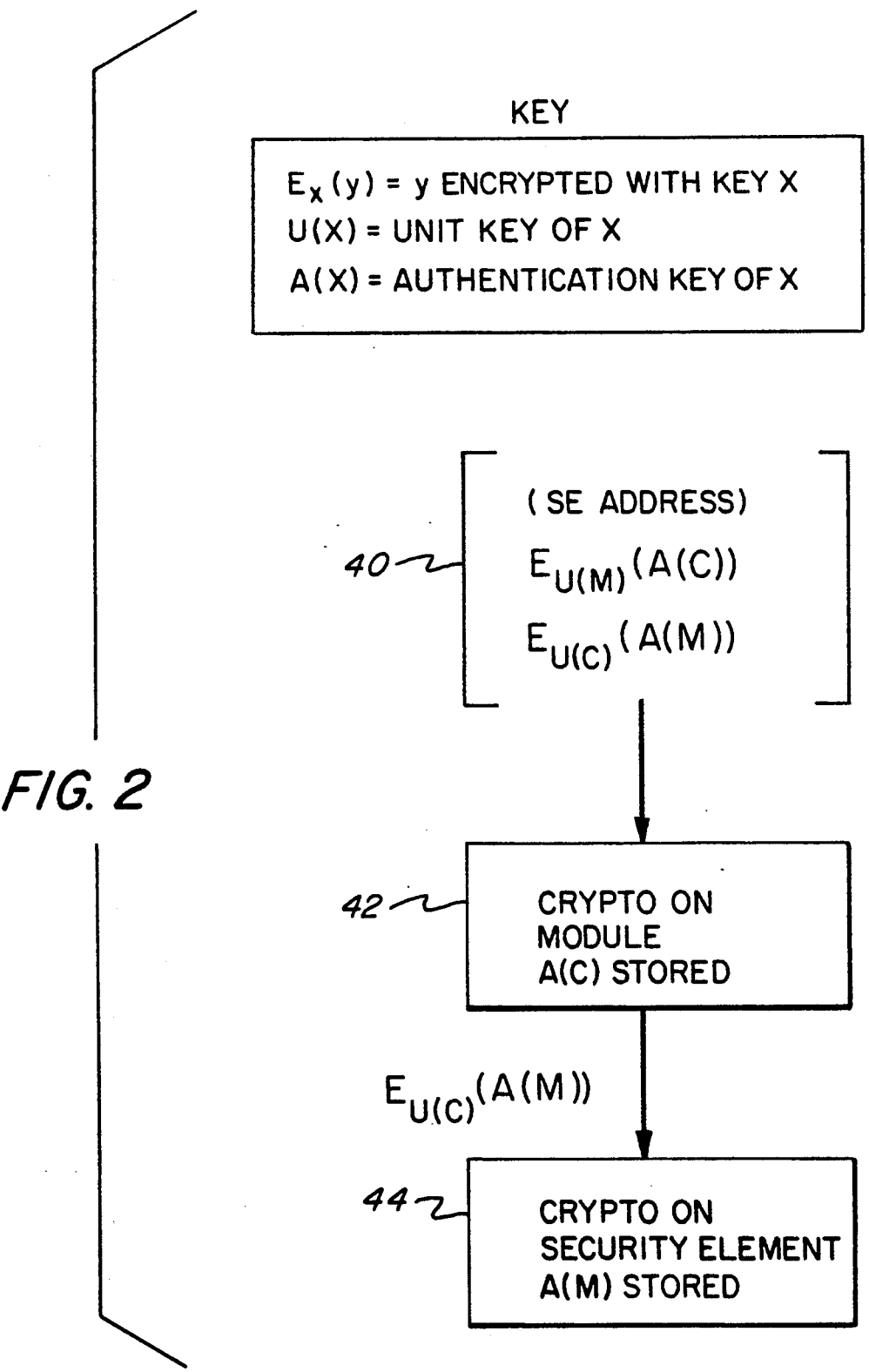
FIG. 2 is a diagram illustrating the information flow to the information processor and the security element during initialization of a new security element.

The flow of information to the information processor and security element during remote initialization is illustrated in FIG. 2. At initialization, the cryptographic processor 24 of information processor 10 will receive a message instructing it to go into security element support mode. If the specific implementation provides for message filtering by the information processor on the basis of a security element address, the security element's address (SE address) will also be received. In addition, a security element authentication key (A(C)) encrypted under a unit key (U(M)) uniquely assigned to the information processor will be received. These signals are indicated at box 40.

Crypto 24 will decrypt the security element's authentication key and store it in secure RAM 20. It will also store the security element's address in RAM 20 if required for subsequent message filtering.

The remote initialization message will also contain a unit addressed message to crypto processor 34 of security element 12 containing the information processor's secret authentication key (A(M)) encrypted under a unit key (U(C)) assigned to the security element. In the event remote initialization is not used, all of the necessary initialization data will be loaded into the security element prior to forwarding it to the subscriber.

Immediately after initialization, the data necessary to enable the security element to generate the working keys required by crypto 24 will be transmitted via satellite or other means (e.g., telephone), to enable authorized television signals to be descrambled. In the event remote initialization is not used, information not frequently broadcast (i.e., the category key) can be sent ahead of time and stored by the information processor for later transfer to the security element.

An information processor can be remotely placed into "stand alone" mode, for use without security element 12. In this mode, it will operate functionally in the same manner as known VideoCipher II Plus descrambler modules, except that in remote initialization situations, it will always look for security element initialization messages that are addressed to it.

When the information processor receives a remote initialization message to enable security element support mode, it must decrypt the security element's authentication key (A(C)) and store it in nonvolatile secure memory (e.g., key and address RAM 20) as indicated at box 42 of FIG. 2. The information processor must also store the security element's unit address in nonvolatile memory 20, for implementations where security element addressable message filtering is provided. It will then pass its own authentication key (A(M)) encrypted by the security element unit key (U(C)) to the security element, which will decrypt the module authentication key and store it in key RAM 38 as indicated at box 44. Crypto 24 will then function in security element support mode.

When crypto 24 is in security element support mode, its functionality changes. It will receive and process messages for both itself and for crypto 34 of the security element, and will also receive and process the data needed by the security element for use in generating the working keys. If the information processor receives a message to return to stand alone mode, it will do so and disable the security element interface.

Figure 3:
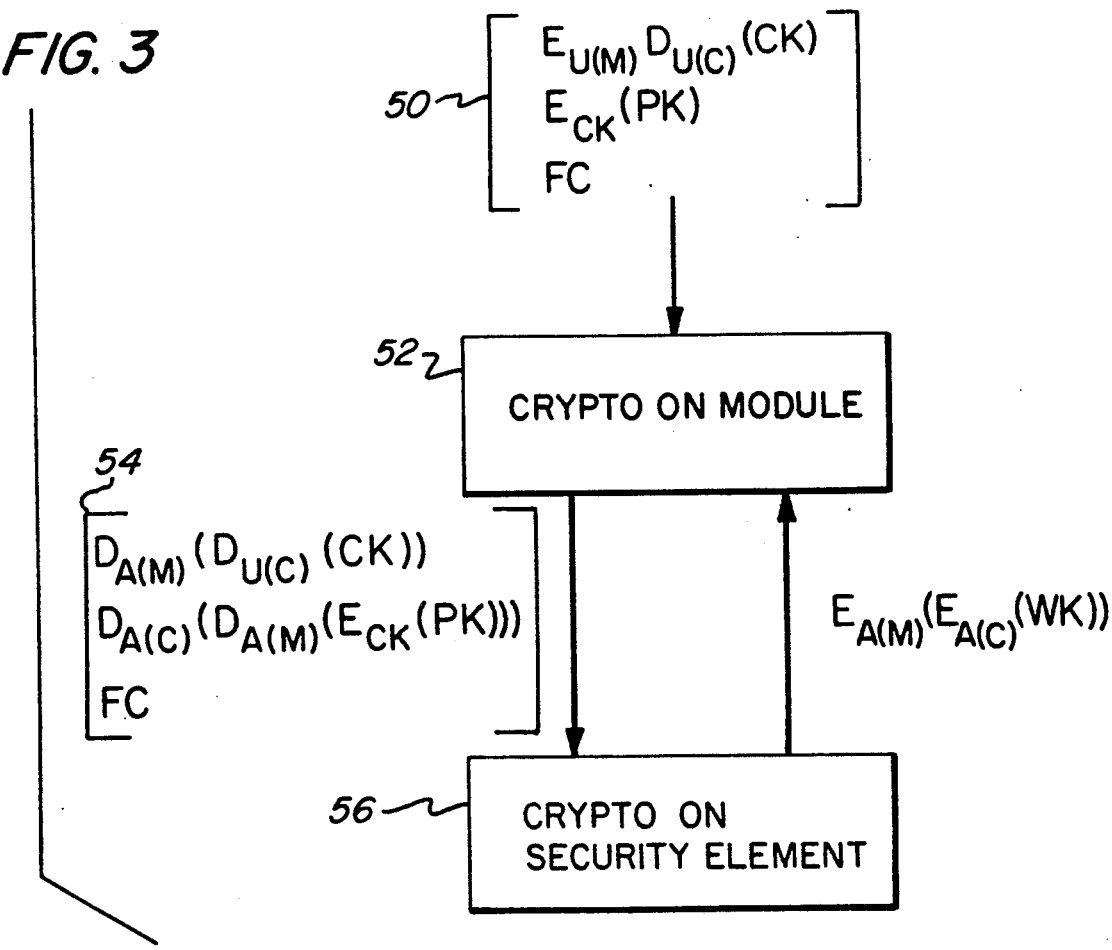
FIG. 3 is a diagram illustrating the information flow of data to the information processor and security element and the communication of the encrypted working key from the security element to the information processor in accordance with the present invention.

In a preferred embodiment, all secure values that cross the interface between the information processor and security element are encrypted (or decrypted) by the authentication keys of both the information processor and the security element. The status of the secure values passed to the information processor and between the information processor and the security element are illustrated in FIG. 3. As can be seen, when information processor 10 receives a "category key" ("CK") message (boxes 50, 52), which key is part of the data used by the security element to generate working keys, it must decrypt the encrypted category key ($E_{U(M)}D_{U(C)}(CK)$) using its own unit key (U(M)), and then it must decrypt the result under its own authentication key (A(M)) (which is known to the security element) before passing this field out to the security element (box 54). The second decryption ($D_{A(M)}(D_{U(C)}(CK))$) is used to protect data and is not actually doing the inverse of a previous encrypt.

In a similar manner, the information processor must decrypt the category encrypted program keys ($E_{CK}(PK)$), which are used by the security element to generate working keys, by both its authentication key (A(M)) and the security element's authentication key (A(C)) before communicating the message to security element 12. This is depicted at box 54. A frame count message (additional data used in generating the working keys) goes out to the security element without encryption as indicated at box 54.

The only values that are communicated by the security element to the information processor, as indicated at the output of box 56, are encrypted working keys. As shown, the working keys are encrypted under both the security element's authentication key (A(C)) and the information processor's authentication key (A(M)).

Information processor crypto 24 must decrypt the working keys by its own authentication key and then by the security element's authentication key. It then passes the clear working key to initialize key stream generation in a conventional manner. Since the working key is received by crypto 24 encrypted by the information processor's secret authentication key, there is no way to breach the interface without knowledge of the secret authentication key. When in the security element support mode, the information processor crypto 24 must always decrypt incoming working keys.

As should be apparent, the only job of the security element is to produce encrypted working keys. Because of its limited functionality, it can be manufactured at a low cost. The derivation of working keys from the data forwarded to the security element will depend on the particular security algorithm used. This algorithm should be different for every version of the security element, to maintain the difficulty of breaking each new version.

It should now be appreciated that the present invention provides a field upgradeable security system that can be used for deciphering signals received from a communication network. As one version of security is breached, a new version is implemented by replacing low cost security elements that provide working keys to an information processor. The working keys are communicated from the security element to the information processor in an encrypted form under a secret key known only to the information processor and an authorized security element. In order to obtain the secret key, the unit key of the security element must be correct, since the secret key is communicated to the security element encrypted under the unit key.

Although the invention has been described in connection with a specific embodiment thereof, those skilled in the art will appreciate that numerous adaptations and modifications may be made thereto, without departing from the spirit and scope of the invention, as set forth in the following claims.

What is claimed is:

1. A field upgradeable security system for processing signals comprising:
    an information processor having a receptacle for receiving a separate unitary replaceable security element;
    said replaceable security element including:
    means for generating a working key;
    means for encrypting said working key with a secret key; and
    means for communicating the encrypted working key to said information processor;
    wherein said information processor includes means for decrypting the encrypted working key for use in processing a signal.

2. A system in accordance with claim 1 further comprising:
    means for communicating data to said security element for use in generating said working key.

3. A system in accordance with claim 2 wherein said data is communicated to said security element via said information processor.

4. A system in accordance with claim 3 wherein said information processor comprises:
    means for receiving said data in an encrypted form;
    means for at least partially decrypting the received data; and means for communicating the at least partially decrypted, received data to said security element.

5. A system in accordance with claim 4 wherein said information processor comprises:
means for further encrypting said data before communicating it to said security element.

6. A system in accordance with claim 3 wherein said information processor comprises:
means for receiving said data in an encrypted form; and
means for further encrypting said data before communicating it to said security element.

7. A system in accordance with claim 2 wherein said security element further comprises:
means for storing a unit key uniquely associated therewith;
means for receiving said data encrypted under said unit key; and
means, coupled to retrieve said stored unit key, for decrypting said data with said unit key for use in generating said working key.

8. A system in accordance with claim 7 wherein said information processor further comprises:
means for storing a unit key uniquely associated therewith;
means for receiving said data from a trusted center encrypted under said security element unit key and said information processor unit key;
means, coupled to retrieve said stored information processor unit key, for decrypting said data with said information processor unit key; and
means for communicating the resultant data still encrypted under said security element unit key to said security element.

9. A system in accordance with claim 7 wherein said secret key comprises a first authentication key assigned to said information processor.

10. A system in accordance with claim 9 wherein:
said information processor comprises means for further encrypting said data under said first authentication key before communicating it to said security element; and
said security element includes means for decrypting said data with both said security element unit key and first authentication key.

11. A system in accordance with claim 10 wherein:
said security element further comprises means for storing a second authentication key uniquely associated therewith; and
said information processor comprises means for also encrypting said data under said second authentication key before communicating it to said security element.

12. A system in accordance with claim 10 wherein said security element further comprises:
means for storing a second authentication key uniquely associated therewith; and
means for encrypting said working key with said second authentication key in addition to said first authentication key for communication to said information processor;
wherein said information processor includes means for decrypting said working key with both said first and second authentication keys.

13. A system in accordance with claim 9 wherein:
said security element further comprises means for storing a second authentication key uniquely associated therewith; and
said information processor comprises means for encrypting said data under said second authentication key before communicating it to said security element.

14. A system in accordance with claim 8 wherein said secret key comprises a first authentication key assigned to said information processor.

15. A system in accordance with claim 14 wherein:
said information processor comprises means for further encrypting said data under said first authentication key before communicating it to said security element; and
said security element includes means for decrypting said data with both said security element unit key and first authentication key.

16. A system in accordance with claim 15 wherein:
said security element further comprises means for storing a second authentication key uniquely associated therewith; and
said information processor comprises means for also encrypting said data under said second authentication key before communicating it to said security element.

17. A system in accordance with claim 15 wherein said security element further comprises:
means for storing a second authentication key uniquely associated therewith; and
means for encrypting said working key with said second authentication key in addition to said first authentication key for communication to said information processor;
wherein said information processor includes means for decrypting said working key with both said first and second authentication keys.

18. A system in accordance with claim 14 wherein:
said security element further comprises means for storing a second authentication key uniquely associated therewith; and
said information processor comprises means for encrypting said data under said second authentication key before communicating it to said security element.

19. A system in accordance with claim 1 wherein said secret key comprises a first authentication key associated with said information processor, and further comprising:
means for securely communicating said first authentication key to the security element.

20. A system in accordance with claim 19 further comprising:
a second authentication key associated with said security element; and
means for securely communicating said second authentication key to the information processor;
wherein said security element encrypts the working key with both of said first and second authentication keys.

21. A system in accordance with claim 20 wherein:
said information processor further comprises:
a unit key associated therewith,
means for receiving said second authentication key encrypted under said unit key; and
means for decrypting the received second authentication key.

22. A system in accordance with claim 19 wherein:
said security element further comprises:
a unit key associated therewith;

means for receiving said first authentication key encrypted under said unit key; and means for decrypting the received first authentication key.

23. A unitary replaceable security element, for use in combination with a separate information processor having a secret cryptographic key, comprising:

means for generating a working key for use by said information processor in processing a signal;

means for receiving said secret key;

means for encrypting said working key with said secret key; and means for communicating the encrypted working key to said information processor.

24. A replaceable security element in accordance with claim 23 further comprising:

means for receiving data for use in generating said working key.

25. A security element in accordance with claim 24 wherein said data is received encrypted under a unit key associated with said security element, said security element further comprising means for decrypting the encrypted data.

26. A security element in accordance with claim 25 further comprising:

an authentication key associated therewith;

wherein said encrypting means encrypts the working key with said secret and authentication keys.

27. A security element in accordance with claim 24 wherein said data is received encrypted under said secret key, said security element further comprising means for decrypting the encrypted data.

28. A security element in accordance with claim 27 further comprising:

an authentication key associated with said security element;

wherein said encrypting means encrypts the working key with said secret and authentication keys.

29. A security element in accordance with claim 24 further comprising:

a unit key associated with said security element;

wherein said data is received encrypted under said secret and unit keys, said security element further comprising means for decrypting the encrypted data.

30. A security element in accordance with claim 29 further comprising:

an authentication key associated with said security element;

wherein said encrypting means encrypts the working key with said secret and authentication keys.

31. A security element in accordance with claim 23 further comprising:

a unit key associated therewith;

means for receiving said secret key encrypted under said unit key; and means for decrypting the received secret key.

32. A security element in accordance with claim 24 further comprising:

an authentication key associated therewith;

wherein said data is received encrypted under said authentication key.

33. A security element in accordance with claim 32 wherein said data is received encrypted under said authentication key and said secret key.

34. A security element in accordance with claim 30 further comprising:

a unit key associated therewith;

wherein said data is received encrypted under said unit key and said authentication key.

35. A security element in accordance with claim 32 further comprising:

a unit key associated therewith;

wherein said data is received encrypted under said unit key, authentication key, and secret 36. A security element in accordance with claim 23 further comprising:

an authentication key associated therewith;

wherein said encrypting means encrypts the working key with said secret and authentication keys.

37. A security element in accordance with claim 23 wherein an authentication key associated with said security element is used as said secret key.

38. An information processor, for use in combination with a separate unitary replaceable security element, comprising:

means for receiving a replaceable security element;

memory means for storing a secret cryptographic key associated with the information processor;

means for receiving a working key, encrypted under said secret key, from said security element;

means coupled to retrieve said secret key from said memory means for decrypting the received working key; and means coupled to use the decrypted working key for processing an information signal.

39. An information processor in accordance with claim 38 further comprising:

means for receiving and storing an additional cryptographic key associated with said security element;

wherein said working key is received encrypted under said secret key and said additional key for decryption by said decrypting means.

40. An information processor in accordance with claim 39 further comprising:

means for storing a unit key uniquely associated therewith;

wherein said additional key is received encrypted under said unit key.

41. An information processor in accordance with claim 40 further comprising means for decrypting said additional key with said unit key prior to storing the additional key in said storing means.

42. An information processor in accordance with claim 38 further comprising:

means for receiving data for use by said security element in generating said working key; and means for communicating said data to the security element.

43. An information processor in accordance with claim 42 wherein said data is received encrypted under a first unit key uniquely associated with said information processor and a second unit key uniquely associated with said security element, said information processor further comprising:

means for decrypting the received data with said first unit key before communicating it to said security element still encrypted under said second unit key.

44. An information processor in accordance with claim 43 further comprising:

means for further encrypting said data under said secret key prior to communicating it to the security element.

45. An information processor in accordance with claim 43 further comprising:

means for receiving and storing an additional cryptographic key associated with said security element; and means for encrypting said data under at least one of said secret and additional keys for communication to the security element.

46. An information processor in accordance with claim 45 wherein said data is encrypted under said secret key and said additional key for communication to said security element.

47. An information processor in accordance with claim 46 wherein said additional cryptographic key is received encrypted under a unit key uniquely associated with said information processor.

48. An information processor in accordance with claim 42 further comprising:
means for encrypting said data under said secret key for communication to the security element.

49. An information processor in accordance with claim 42 further comprising:
means for receiving and storing an additional cryptographic key associated with said security element; and
means for encrypting said data under at least one of said secret and additional keys for communication to the security element.

50. An information processor in accordance with claim 49 wherein said data is encrypted under said secret key and said additional key for communication to said security element.

51. An information processor in accordance with claim 49 wherein said additional cryptographic key is received encrypted under a unit key uniquely associated with said information processor.

52. An information processor in accordance with claim 42 further comprising:
means for receiving and storing an additional cryptographic key associated with said security element;
wherein said working key is received encrypted under said secret key and said additional key for decryption by said decrypting means.

53. An information processor in accordance with claim 52 wherein said data is encrypted under at least one of said secret and additional keys for communication to said security element.

54. An information processor in accordance with claim 42 further comprising:
means for receiving and storing characteristic information identifying said security element; and
means for screening received data on the basis of said characteristic information for selective communication to said security element.

55. An information processor in accordance with claim 38 wherein said information signal is a scrambled communication signal that is descrambled by said processing means.

56. An information processor in accordance with claim 55 further comprising:
means for enabling and disabling said security element in response to a received control signal.

57. An information processor in accordance with claim 56 further comprising:
means for descrambling communication signals according to a default descrambling algorithm in the absence of an enabled security element.

58. An information processor in accordance with claim 38 wherein said secret key is an authentication key associated with said information processor.

59. An information processor in accordance with claim 38 further comprising:
means for enabling and disabling said security element in response to a received control signal.

60. A field upgradeable security system for processing signals received from a communication network comprising:
an information processor having a first unit key associated therewith;
a security element having a second unit key associated therewith and operatively associated with said information processor for communicating a working key thereto;
means operatively associated with said information processor for receiving data encrypted under said first and second unit keys, decrypting said data with said first unit key, and communicating the resultant data still encrypted under said second unit key to said security element; and
means operatively associated with said security element for decrypting said resultant data with said second unit key and processing the decrypted data to generate said working key.

61. A system in accordance with claim 60 further comprising:
a first authentication key associated with said information processor;
means operatively associated with said information processor for further encrypting said resultant data with said first authentication key for communication to said security element; and
means operatively associated with said security element for decrypting said resultant data with both said second unit key and said first authentication key.

62. A system in accordance with claim 61 further comprising:
a second authentication key associated with said security element;
means operatively associated with said security element for encrypting said working key with at least one of said first and second authentication keys; and
means operatively associated with said information processor for decrypting said working key.

63. A system in accordance with claim 60 further comprising:
means operatively associated with said security element for encrypting said working key; and
means operatively associated with said information processor for decrypting said working key.

64. A system in accordance with claim 63 wherein said security element encrypts said working key under an authentication key associated with the security element.

65. A system in accordance with claim 63 wherein said security element encrypts said working key under an authorization key associated with said information processor.

66. A system in accordance with claim 60 further comprising:
a first authentication key associated with said security element;
means operatively associated with said resultant data with said first authentication key for communication to said security element; and
means operatively associated with said security element for decrypting said resultant data with both said second unit key and said first authentication key.

67. A system in accordance with claim 66 further comprising:
- a second authentication key associated with said information processor;
- means operatively associated with said security element for encrypting said working key with at least one of said first and second authentication keys; and
- means operatively associated with said information processor for decrypting said working key.

68. A system in accordance with claim 60 wherein said security element is adapted to be removably connected to said information processor for easy replacement.

* * * * *

Adverse Decisions In Interference

Patent No. 5,111,504, James N. Esserman, INFORMATION PROCESSING APPARATUS WITH REPLACEABLE, SECURITY ELEMENT, Interference No. 104,001, final judgment adverse to the patentees rendered February 4, 2000, as to claim 60 and 68.
*(Official Gazette June 13, 2000)*

Adverse Decisions In Interference

Patent No. 5,111,504, James N. Esserman, INFORMATION PROCESSING APPARATUS WITH REPLACEABLE, SECURITY ELEMENT, Interference No. 104,001, final judgment adverse to the patentees rendered February 4, 2000, as to claims 60 and 68.

*(Official Gazette July 4, 2000)*